United States Patent [19]

Hareng et al.

[11] 4,390,244
[45] Jun. 28, 1983

[54] LIQUID CRYSTAL VISUAL DISPLAY UNIT AND TELEPHONE TERMINAL INCORPORATING SUCH A UNIT

[75] Inventors: Michel Hareng; Serge Le Berre; Pierre Leclerc; Jean Noël Perbet, all of Paris, France

[73] Assignee: Thomson-CSF, Paris, France

[21] Appl. No.: 171,408

[22] Filed: Jul. 23, 1980

[30] Foreign Application Priority Data

Jul. 27, 1979 [FR] France ............................. 79 19426

[51] Int. Cl.³ .......................................... G02F 1/13
[52] U.S. Cl. ........................... 350/333; 350/339 R; 350/351; 350/336
[58] Field of Search ............... 350/333, 339 R, 350 R, 350/351, 336

[56] References Cited

U.S. PATENT DOCUMENTS

3,912,366 10/1975 Sprokel ............................. 350/339 R
4,202,010 5/1980 Hareng et al. .................. 350/351 X
4,264,148 4/1981 Göbl-Wunsch et al. ... 350/350 R X

FOREIGN PATENT DOCUMENTS

2389955 of 0000 France .

OTHER PUBLICATIONS

*Industrial Chemicals*, 4th ed., New York, Wiley-Interscience, 1975, pp. 401-402.
Kaneko, E., et al., "Liquid Crystal Television Display", *Proceedings of the Society of Information Displays*, vol. 19, No. 2, (Apr. 1978), pp. 49-54.

*Primary Examiner*—John K. Corbin
*Assistant Examiner*—Richard F. Gallivan
*Attorney, Agent, or Firm*—Cushman, Darby & Cushman

[57] ABSTRACT

A liquid crystal visual display with a liquid crystal layer between two plates and resistive lines between one of the plates and the liquid crystal layer for heating the crystal to produce a display. The thermal diffusivity of the plate supporting the lines is below a value making possible viewing with the naked eye, for example $2 \times 10^{-2}$ cm²/s.

12 Claims, 5 Drawing Figures

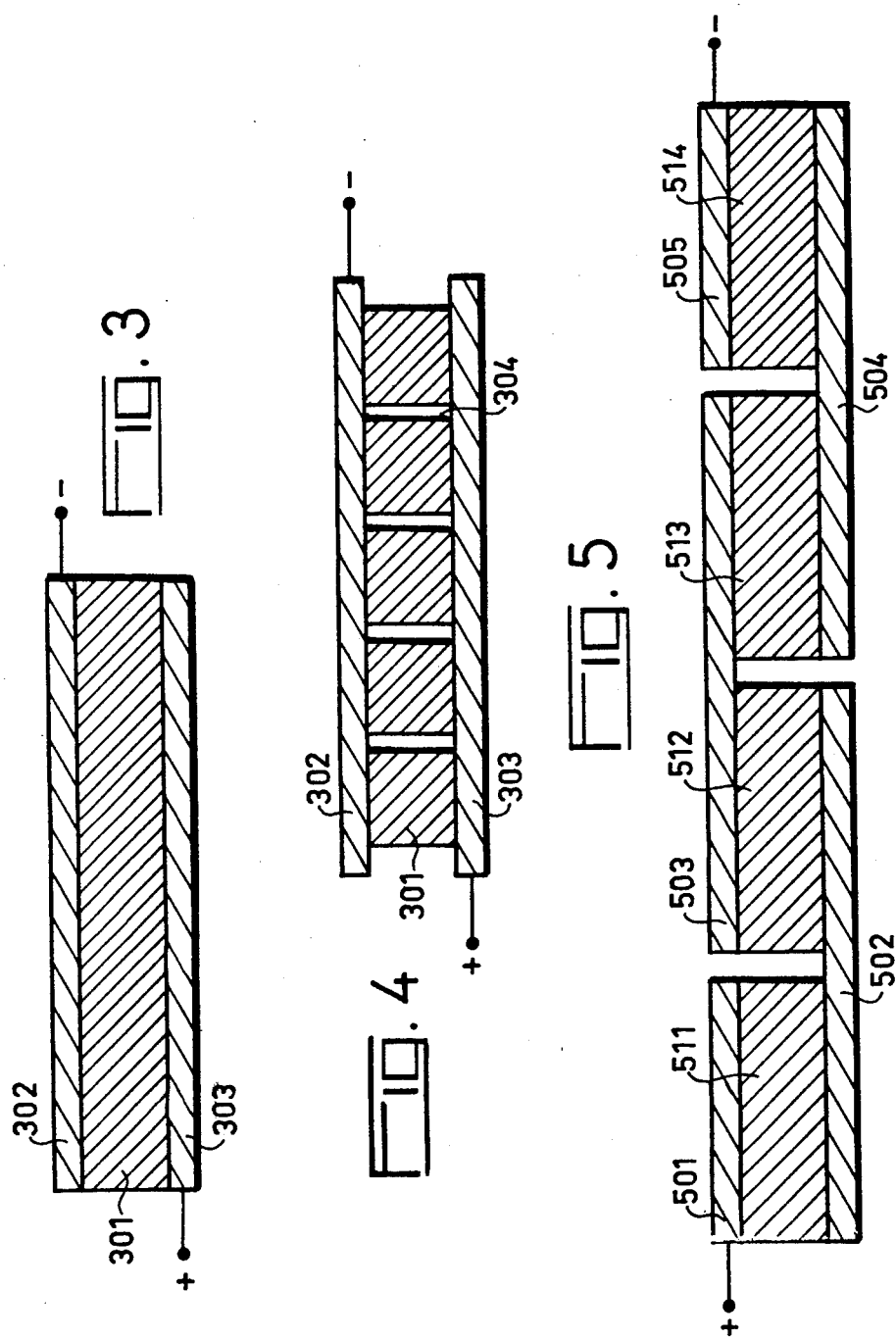

LIQUID CRYSTAL VISUAL DISPLAY UNIT AND TELEPHONE TERMINAL INCORPORATING SUCH A UNIT

BACKGROUND OF THE INVENTION

The present invention relates to liquid crystal visual display units making it possible to display visual information represented by an electrical signal applied to said units. It also relates to telephone terminals incorporating such a unit and which make it possible, for example, to remotely consult a telephone directory.

It is known to construct liquid crystal visual display units using different electro-optical effects.

U.S. Pat. No. 4,202,010 corresponding to French Pat. No. 2389955 entitled "Picture display unit and television system using such a unit" describes a visual display unit in which inscription takes place by means of a thermoelectric effect.

For this purpose the unit comprises a system of heating lines which are successively excited by a heating voltage. The liquid crystal passes into a liquid phase along the line which is heated and then becomes diffusive on cooling. The unit also comprises a system of columns which intersect with the system of lines. A group of voltages representing the line to be inscribed is applied to these columns during the cooling of the line. As a function of the value of the electrical field resulting from the voltages applied the liquid crystal becomes more or less diffusive at each intersection between the columns and the cooling line. It is thus possible to inscribe or enter in the unit a picture or image analysed in accordance, for example, with a television field. This inscription takes place on a line by line basis. The thus inscribed picture remains stored until an erasure takes place. The latter occurs, for example, on inscribing the following picture where each line is erased during heating and then inscribed with the new signal during cooling.

The dimensions of this unit are essentially limited for thermal dissipation reasons. Thus, if it was desired to obtain a unit which could be observed with the naked eye and at a reasonable distance a very high power would have to be dissipated in each heating line. It would not be possible to control this power and it could lead to the destruction of the system. In order to observe the thus inscribed picture it is possible in certain cases to use a magnifying glass, but most often it is projected on to a screen. For the use of such a unit in a television receiver the overall dimensions, cost and maintenance requirements of the ancilary devices necessary for carrying out such a projection are of little importance.

However, when using such a unit in a telephone terminal, particularly for consulting a directory, it is absolutely necessary to be able to see it directly without effecting a projection. The dimensions which are then necessary, approximately 10 centimeters, do not make it possible to construct the unit without adaptation.

BRIEF SUMMARY OF THE INVENTION

The present invention therefore relates to a liquid crystal visual display unit of the type incorporating a liquid crystal layer which can be inscribed by the thermoelectric effect and incorporated between two plates whereof at least one is transparent, a system of resistive lines located between one of the plates and the liquid crystal layer and making it possible to heat the liquid crystal at least up to its erasure temperature successively in accordance with each of the lines and a system of columns located between the other plate and the liquid crystal layer intersecting with the lines and making it possible to apply to the whole of this layer during the cooling of a line an electric field representing the information to be inscribed along the cooling line, wherein the thermal diffusivity of the plate supporting the resistive lines is below a value making it possible to obtain a unit which can be observed with the naked eye.

BRIEF DESCRIPTION OF THE DRAWINGS

FIG. 3 shows one embodiment of a transparent heating line for the inventive display cell;

FIG. 4 shows a variant of the transparent heating line of FIG. 3;

FIG. 5 shows another variant of the transparent heating line.

DESCRIPTION OF THE DRAWINGS AND PREFERRED EMBODIMENTS

Figure 1:
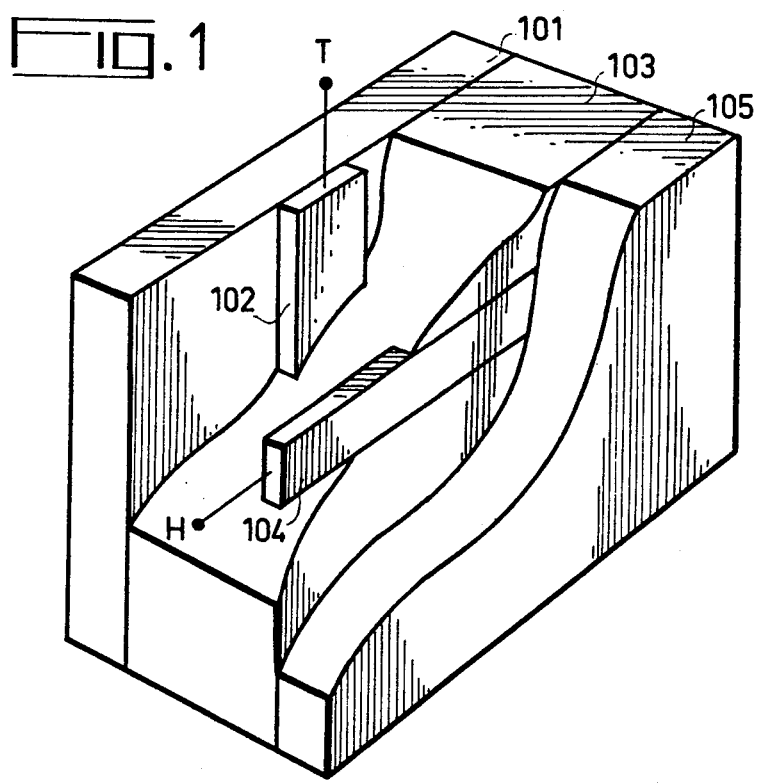
FIG. 1 is a cut-away perspective view of a portion of the inventive display cell showing a single visual display point.
Figure 2:
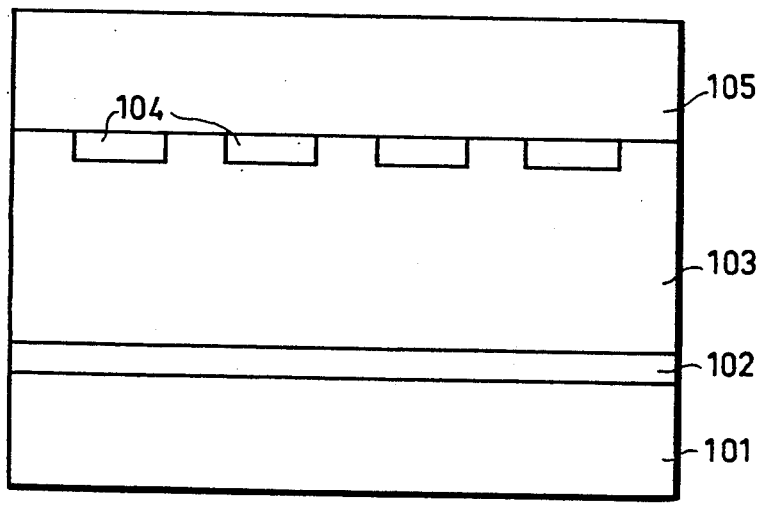
FIG. 2 shows a section of the inventive display cell.

The invention is described in greated detail hereinafter relative to non-limitative embodiments and FIGS. 1 and 2 of the drawings showing two different views of the same visual display unit. FIG. 2 shows a section thereof, while FIG. 1 is a perspective view. The view of FIG. 1 is limited, for reasons of clarity, to a portion of the unit incorporating a single electrode in each direction and defining a single visual display point.

A liquid crystal layer 103 is inserted between two plates 101 and 105. A system of resistive lines such as 102 is deposited on plate 101 in contact with the liquid crystal. By means of electrodes such as T these lines are supplied by a heating voltage which heats them by the Joule effect to a temperature bringing the liquid crystal into the isotropic phase. On removing the heating voltage the liquid crystal cools and during cooling assumes a so-called focal conic structure which is diffusive.

On contact with the liquid crystal plate 105 carries a system of columns such as 104 provided with connections H. By applying a voltage of appropriate value between connections T and H during the cooling of the liquid crystal an electric field is produced within said liquid crystal at the intersection points of lines 102 and columns 104. This electrical field then prevents the focal conic structure from being established during cooling and the liquid crystal retains its transparent appearance. This electrical field only acts on the crystal which is being cooled and is unable to reorient the crystal which is being cooled and diffused before the application of the electrical field. The system of lines 102 and columns 104 makes it possible to inscribe the desired information on each of the lines whilst proceeding with a line by line addressing by successively heating each of the lines 102 and by applying the desired voltages to columns 104.

It is possible to produce a unit for providing a television-type display, i.e. with a maximum time for inscribing one line less than 64 microseconds. For this purpose it is necessary to rapidly heat and cool the liquid crystal and consequently the entire zone surrounding the heating line used. The constraint on the cooling time leads to the use for plate 101 of a silicon substrate covered with a fine layer of silicon monoxide permitting the electrical insulation of the heating lines 102 from the said substrate.

The thus fixed heat diffusion rate to substrate 101 imposes a minimum value to the heat dissipation by the Joule effect and surface unit in line 102. Thus, the minimum power per heating line length unit is obtained, bearing in mind that it is necessary to respect a certain format of the picture to be displayed. Since it is necessary to be able to control the voltages applied to connections T which in practice impose the use of an integrated circuit in substrate 101, it is impossible to exceed a certain total supply power of the heating lines, which would in fact be destroyed by the heat given off if this power level was exceeded. Bearing in mind all these points the dimensions of the units produced are approximately 1 centimeter.

To use a visual display unit of this type in a telephone terminal for e.g. remotely consulting a telephone directory it is desirable for the purpose of carrying out a direct observation under comfortable conditions for the subscriber to produce a unit having dimensions of approximately 10 centimeters. If produced in the manner described hereinbefore such a unit would require an extravagant supply power of a few kilowatts.

However, it is not then necessary to use a television-type scanning and the usual specifications require the inscription of 120 alphanumeric characters/second in the form of 25 of lines 40 characters for a 10×10 cm screen. When assuming the analysis of an alphanumeric character produced according to a 7×5 matrix and counting 2 run-up times between the characters and 3 run-up times between the lines this corresponds to 200 lines and 200 columns or 2 lines and 2 columns/mm, their width being equal to a little less than 50 hundredths of a millimeter to take account of a certain gap between them. Thus, the lines are addressed to obtain 120 characters/second at a rate of 24 heating lines/second, i.e. a time available for the inscription of at the most equal to 40 milliseconds.

Thus, a much longer time is available than in the presently known unit for cooling the liquid crystal after it has been heated. The thermal diffusivity of the silicon substrate covered with a thin layer (approximately 5$\mu$) of silicon monoxide which is 1 cm$^2$/s and which permitted the speed necessary for a television-type display is no longer of any use here and can even be prejudicial due to the large dimensions of the unit and the heating power which it requires. However, a relatively large amount of heat must be removed by plate 101 and not by liquid crystal 103 in order that a cumulative phenomenon does not bring the complete liquid crystal into the isotropic state without being able to return to the diffusive state, except by cutting off the power supply to the apparatus for a relatively long period. As the diffusivity of the liquid crystal is used is generally approximately $2 \times 10^{-3}$ cm$^2$/s it is possible, for example, to use glass, whose thermal diffusivity is substantially $5.5 \times 10^{-3}$ cm$^2$/s. This material is inexpensive and can be obtained with the desired dimensions with a surface state which is completely suitable for the envisaged application. However, its diffusivity is a little too low compared with that of the liquid crystal and, if necessary, it is possible to use silica ($8.3 \times 10^{-3}$ cm/s) or sapphire ($8.4 \times 10^{-2}$ cm$^2$/s) or synthetic materials such as ethylene glycol polyterephthalate ($2 \times 10^{-4}$ cm$^2$/s) or polyimide ($4 \times 10^{-3}$ cm$^2$/s). As these materials are flexible in the usually available thicknesses they are generally employed by doubling a plate forming a substrate and which can be of glass in the case of a unit used in transmission.

There are two possible construction modes, depending on whether visual display takes place by reflection of ambient light or by transmission of light coming from a source located behind the screen.

In the case of operation by reflection, which is already known for the cell for the television visual display described hereinbefore, display takes place by reflection of the reflecting surface of the heating lines. These lines can then be produced, for example, by evaporating under vacuum aluminium with a thickness of 2 to 3000 Å. A resistive line of this thickness, with a length of 10 cm and a width of 40 hundredths of a millimeter will have a resistance substantially equal to 50 ohms.

In order to be able to carry out an inscription in less than 40 milliseconds the power necessary for an ethylene glycol polyterephthalate substrate is 100 watts and for a polyimide substrate 50 watts. The supply voltage is then approximately 50 volts, which is quite compatible with the semiconductor switching devices liable to be used for control purposes.

The columns making it possible to apply the electrical fields to the liquid crystal are transparent and are made, for example, from a mixed oxide of indium and tin. As they do not dissipate power their construction is of an entirely conventional nature.

To obtain a visual display by transmission it is necessary that the heating lines are transparent and are made, for example from a mixed oxide of indium and tin and in a limited thickness. Under these conditions the resistivity of the transparent oxide layer is necessarily higher. A standard value is 1250 ohms per square. In order to then obtain the necessary heating power by supplying such an electrode between its terminals it would be necessary to use a much too high voltage, which could not be switched by semiconductor control devices. To obviate this disadvantage a special construction of the heating line is necessary.

In a first embodiment of such a transparent heating line shown in FIG. 3 a transparent conductive layer of high resistivity 301 is placed between two conductors 302 and 303 extending along the line and having a very low resistivity. These conductors are, for example, obtained by aluminium evaporation with a relatively large thickness of e.g. 1 micron and their resistance is negligible compared with that of layer 301. The latter is consequently supplied between the positive and negative terminals on the heating voltage source perpendicular to its largest dimension and the overall resistance is thus brought to a correct value of approximately 50 ohms.

In a constructional variant shown in FIG. 4 layer 301 is divided into a series of blocks separated by slots 304 perpendicular to electrodes 302 and 303. These blocks exactly correspond to the intersection with columns 104 permitting the application of the electrical field. This arrangement serves to regularize the current lines within layer 301.

In another constructional variant shown in FIG. 5 the transparent conductive layer of lower resistivity than that of FIGS. 3 and 4 is used and in order to retain an adequate total resistance the heating line is divided into four equally long portions respectively 511 to 514, which are electrically arranged in series by five electrodes 501 to 505 connected to portions 511 to 514 by their largest sides. Thus, the electrical current traverses each of these portions perpendicular to its greatest length. This leads to a relatively low resistance of each portion. However, these portions are then arranged in series, thereby multiplying by four, as compared with the resistance of one portion, the total resistance of the heating line. Thus, in the case of the drawing, the electrical current starts from electrode 501 to pass to electrode 502 across portion 511, then to electrode 503 across portion 512 and so on up to electrode 505.

The variant of FIG. 4 can be used in this case by subdividing each portion such as 511 into parts corresponding to the intersection with the columns 504. The slots used for separating these parts are parallel to the current lines, so that the total resistance remains substantially unchanged.

By using the variant of FIG. 5 with a different number of line portions it is possible to adapt the total resistance of the line to the resistivity of the layer used, this being within a wide range of resistivity.

Whereas in television-type application it is conventional practice to use a liquid crystal of the cyano-alkyl-biphenyl type and particularly 4,4'-cyano-octyl-biphenyl, known as COB, which has between the liquid phase and the isotropic phase in succession a smectic phase A and then a nematic phase. In the case of units according to the invention where the inscription speed is not of vital importance to use a liquid crystal having a cholesteric phase instead of a nematic phase.

For this purpose it is possible, for example, to use the same liquid crystal COB, whilst adding to it a small proportion of a chiral product such as turpentine oil. The thus doped COB then successively has the crystalline phases smectic A, cholesteric and finally isotropic when the temperature rises. During cooling the focal conic structure has a pitch which varies in size with the percentage of chiral product used. As this percentage increases the dimension of the diffusing domains increases and simultaneously the electrical field necessary for obtaining an ordinate phase decreases. When this pitch assumes too high a volume it exceeds the pitch of the screen and inscription becomes impossible. However, when there is little dopant the field to be applied is too great, all the more so because the thickness of the liquid crystal to be used to obtain a continuous plate with a cell having such large dimensions is relatively great. For the construction used a correct value for the dopant quantity is a few percent. Adjustment takes place in order to obtain a pitch for the focal conic structure between 1 and 100 microns.

What is claimed is:

1. A liquid crystal visual display unit of the type incorporating a liquid crystal layer which can be inscribed by the thermoelectric effect and incorporated between two plates, whereof at least one is transparent, a system of resistive lines located between one of the plates and the liquid crystal layer and making it possible to heat the liquid crystal at least up to its erasure temperature successively in accordance with each of the lines and a system of columns located between the other plate and the liquid crystal layer intersecting with the lines and making it possible to apply to the whole of this layer during the cooling of a line an electric field representing the information to be inscribed along the cooling line, wherein the thermal diffusivity of the plate supporting the resistive lines is below a value making it possible to obtain a unit which can be observed with the naked eye.

2. A unit according to claim 1, wherein the diffusivity of the plate supporting the resistive lines is below $2 \times 10^{-2}$ cm$^2$/s.

3. A unit according to claim 2, wherein the liquid crystal can have a smectic A-cholesteric transition.

4. A unit according to claim 3, wherein the liquid crystal is a chiral product-doped cyano-alkyl-biphenyl.

5. A unit according to claim 1, wherein the plate supporting the resistive lines is made from glass.

6. A unit according to claim 1, wherein it also comprises an ethylene glycol polyterephthalate layer inserted between the plate supporting the resistive lines and the latter.

7. A unit according to claim 1, wherein it also incorporates a polyimide layer inserted between the plate supporting the resistive lines and the latter.

8. A unit according to claim 1, wherein the two plates enclosing the liquid crystal are transparent and the resistive lines are formed by a transparent conductive strip of high resistivity inserted between two opaque conductive strips of low resistivity.

9. A unit according to claim 8, wherein the transparent conductive strip is divided into a number of portions corresponding to the intersections of the resistive lines with the columns.

10. A unit according to claim 1, wherein the two plates enclosing the liquid crystal are transparent and each line comprises a system of aligned portions formed from a high resistivity, transparent conductive material, said portions having bordered by opaque, low resistivity conductive strips making it possible to connect these portions in series in such a way that the electrical current traverses them in accordance with their width.

11. A unit according to claim 1, wherein the liquid crystal can have a smectic A-cholesteric transition.

12. A telephone terminal of the type incorporating a telephone set and a visual display screen making it possible to display the information transmitted on the telephone line connected to the telephone set, wherein the display screen is a unit according to any one of the claims 1 to 11.

* * * * *